Patented Sept. 25, 1934

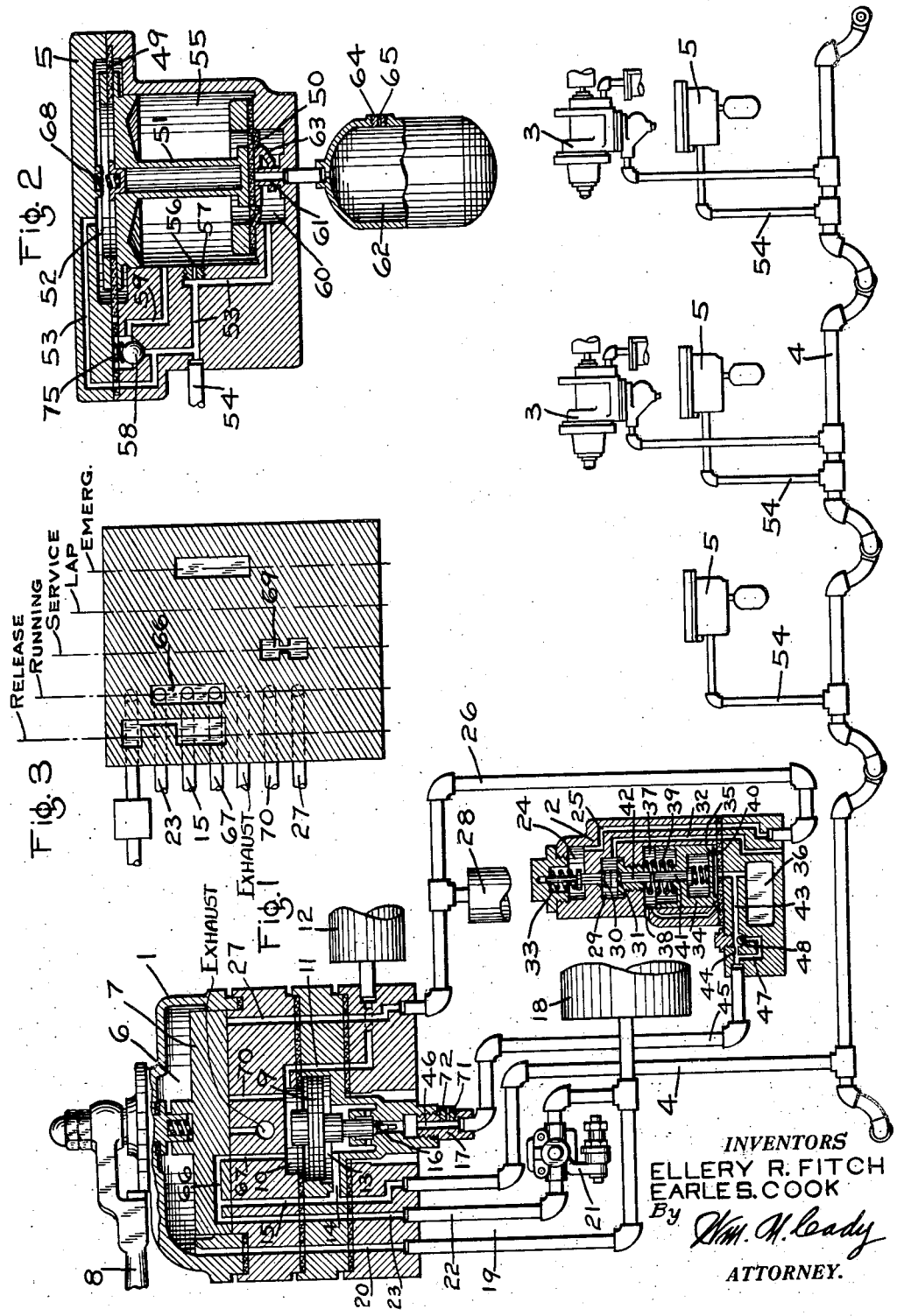

1,974,954

UNITED STATES PATENT OFFICE 1,974,954

FLUID PRESSURE BRAKE

Ellery R. Fitch, Edgewood, and Earle S. Cook, Wilkinsburg, Pa., assignors to The Westinghouse Air Brake Company, Wilmerding, Pa., a corporation of Pennsylvania Application September 17, 1931, Serial No. 563,278

7 Claims. (Cl. 303—35)

This invention relates to fluid pressure brakes, and more particularly to an automatic fluid pressure brake system in which the brakes are applied by effecting a reduction in brake pipe pressure.

In the handling of long trains, it is highly desirable to apply the brakes on cars at the rear end of the train as nearly as possible in synchronism with the application of the brakes on cars at the head end of the train, so as to prevent the slack from running in at such a rate as to cause excessive and damaging shocks.

In order to accomplish this result, the principal object of our invention is to provide a fluid pressure brake system in which a sensitive and yet stable means is provided on the cars of the train and operated upon a reduction in brake pipe pressure for positively effecting a limited local reduction in brake pipe pressure, and means on the locomotive for automatically effecting successive reductions in brake pipe pressure to cause the means on the cars to effect corresponding successive local reductions in brake pipe pressure.

In the accompanying drawing; Fig. 1 is a diagrammatic view, with parts of the locomotive brake apparatus in section, of a fluid pressure brake system for a train of cars, and embodying our invention; Fig. 2 a sectional view of the quick service brake pipe venting valve device employed on cars of the train; and Fig. 3 a diagram, showing the connections made in the different operating positions of the brake valve device.

As shown in the drawing, the fluid pressure brake system may comprise the usual locomotive brake equipment. Only the brake valve device 1 of the locomotive brake equipment is actually shown in the drawing, since it is thought that the invention will be clearly understood without showing the other parts of the locomotive brake equipment.

In addition to the usual locomotive brake equipment, according to our invention, a valve device 2 is provided for automatically effecting successive reductions in brake pipe pressure.

On each car of the train is provided the usual brake controlling valve device, such as the triple valve device 3, which is operated in the usual manner upon a reduction in pressure in the brake pipe 4 to effect an application of the brakes and upon an increase in brake pipe pressure to effect the release of the brakes.

According to our invention, a quick service brake pipe venting valve device 5 is provided on each car of the train, which device is adapted to be operated upon a reduction in brake pipe pressure for effecting a local venting of fluid from the brake pipe.

The brake valve device 1 comprises a casing having a valve chamber 6 containing a rotary valve 7 adapted to be operated by a handle 8. In the brake valve casing is mounted the usual equalizing discharge valve mechanism, comprising a piston 9, having the chamber 10 at one side connected, through a passage 11 with the usual equalizing reservoir 12 and having the chamber 13 at the opposite side connected, through a passage 14 with passage 15 which leads to the brake pipe 4.

The piston 9 is adapted to operate a discharge valve 16 for venting fluid from the brake pipe through a discharge fitting 17. The usual main reservoir 18 is connected through pipe 19 and passage 20 to the rotary valve chamber 6 and the usual feed valve device 21 is adapted to supply fluid under pressure from the main reservoir 18 at a reduced pressure to pipe 22 and passage 23, leading to the seat of the rotary valve 7.

The valve device 2 comprises a casing having a chamber 24 which is connected to a passage 25, and a pipe 26 connects said passage to a passage 27 leading to the seat of the rotary valve 7. Opening into the pipe 26 is a reduction limiting reservoir 28.

The valve device 2 also has a valve chamber 29 provided with a passage 32 leading to the atmosphere and in which are mounted double beat valves 30 and 31. The valve 30 controls communication from chamber 24 to valve chamber 29, and is urged from its seat by a spring 33. In the valve casing is mounted a piston 34 having a seat rib 35 at its lower face and subject on its lower face to the pressure of fluid in a timing reservoir 36.

The chamber 37 at the upper face of the piston 34 is open to the atmosphere through a port 38 and contains a spring 39 which urges the piston in a direction to cause the seat rib 35 to engage a seating gasket 40. The piston 34 is adapted to operate the valves 30 and 31 and for this purpose is provided with a yielding stem 41 adapted to engage the stem 42 of the valve 31.

The timing reservoir 36 and thus the chamber at the lower face of piston 34 is connected to a passage 43 having a choked portion 44, and which passage is connected through a pipe 45 with the discharge passage 46 of the discharge fitting 17. A by-pass passage 47 provides communication through passage 43 around the choke 44 and contains a ball check valve 48.

A preferred form of quick service venting valve device to be employed on cars of the train, is shown in section in Fig. 2 of the drawing, and comprises a casing in which is mounted flexible diaphragms 49 and 50, which are connected to move in unison by a hollow stem 51.

The chamber 52 at one side of the diaphragm 49, which is of greater area than the diaphragm 50, is connected to a passage 53 which leads to a pipe 54, communicating with the brake pipe 4. The chamber 55 intermediate the diaphragms 49 and 50 is also connected to passage 53, through a restricted port 56 in a choke plug 57 and passage 53 is further connected to chamber 55 by way of check valve 58 and passage 59. The chamber 60 at the outer face of diaphragm 50 is also connected to passage 53.

The diaphragm 50 is adapted to engage a valve seat provided on a seat member 61, and controls communication from chamber 60 to a bulb or quick service reservoir 62. Carried by the diaphragm 50 is a guide member 63 which is guided on the seat member 61. The reservoir 62 is provided with a choke plug 64 having a restricted port 65, so that fluid can vent from the reservoir 62 at all times at a rate as determined by the flow area of the port 65.

In operation, when the brake valve device 1 is in running position, the brake pipe 4 is maintained charged with fluid at feed valve pressure by flow from pipe 22, passage 23, through cavity 66 in the rotary valve 7 and passage 15. The chamber 10 at one side of the equalizing discharge valve piston 9 is also charged with fluid under pressure by way of cavity 66 and passage 67, the equalizing reservoir 12 being charged from the chamber 10, through passage 11. The opposing fluid pressures on opposite sides of the piston 9 being equalized, the piston 9 holds the discharge valve 16 seated.

On cars of the train, the triple valve 3 is charged with fluid under pressure from the brake pipe in the usual manner, and chamber 52 of the quick service valve device 5 is charged from the brake pipe 4 by way of pipe 54 and passage 53. The chamber 55 is charged with fluid under pressure through passage 53 and port 56 and also past the check valve 58 through passage 59. The flow past the check valve 58 does not occur, however, until the pressure of fluid in passage 53 acting below the check valve, slightly exceeds the fluid pressure in chamber 55, which acts above the check valve, plus the pressure of spring 75.

The by-pass charging passage 59 with the check valve 58 are provided so as to permit a more rapid build up of pressure in chamber 55, when the brake pipe pressure is increased to release the brakes, since recharge by way of the restricted port 56 would be so slow that particularly at the head end of the train, the brake pipe pressure would be increased in the chamber 52 so much more rapidly than in chamber 55, that there would be liability of damage or rupture of the diaphragm 49. At the same time, the flow from the brake pipe to the chamber 55 is somewhat retarded by the action of the spring-pressed check valve 58, so that in releasing the diaphragm 50 will be held seated by the higher pressure in chamber 52.

When the fluid pressures on the diaphragms 49 and 50 have substantially equalized, the diaphragms will be operated to maintain the diaphragm 50 seated against the seat member 61 by the pressure of spring 68.

In order to effect a service application of the brakes, the brake valve handle 8 is moved to service application position, in which the rotary valve 7 connects passage 27, through a cavity 69 with passage 70, leading to the equalizing piston chamber 10. Fluid under pressure is then vented from the chamber 10 and the equalizing reservoir 12 to the reduction limiting reservoir 28 and through pipe 26 and passage 25 to chamber 24 of the valve device 2. The valve 30 being initially unseated, since the chamber 36 is initially at atmospheric pressure, so that the spring 39 maintains the piston 34 in engagement with the gasket 40, fluid will be vented from chamber 24 to the atmosphere, by way of chamber 29 and passage 32.

The reduction in fluid pressure in chamber 10 and in the equalizing reservoir 12, causes the higher brake pipe pressure in chamber 13 to lift the piston 9 so as to unseat the discharge valve 16. Fluid under pressure is then vented from chamber 13 and the brake pipe 4 through the exhaust fitting 17 to the atmosphere by way of restricted port 71 in choke plug 72 and also into pipe 45.

Fluid vented into pipe 45 flows through the passage 47 past the check valve 48, as well as through the restricted flow port 44 in passage 45 to chamber 36 and the pressure in said chamber builds up until the pressure therein acting on the under face of the piston 34 is sufficient to overcome the pressure of spring 39. The piston 34 is then moved up, causing the stem 41 to engage the valve 42 and move the valve 31 from its seat and also move the valve 30 to its seat.

The atmospheric passage 32 being thus cut off from passage 25, the pressure in the reduction limiting reservoir 28 quickly equalizes with the pressure in the equalizing reservoir 12. When the brake pipe pressure has been reduced by flow past the discharge valve 16 through the restricted port 71 to a degree slightly less than the pressure at which the equalizing reservoir 12 equalizes into the reduction limiting reservoir 12, the piston 9 will be operated to move the valve 16 to its seat, thus cutting off the further venting of fluid from the brake pipe.

When the discharge valve 16 is seated, the pressure in the timing reservoir 36 is reduced at a rate as permitted by the restricted port 44, by flow through the restricted port 71, until the pressure of the spring 39 is sufficient to overcome the reduced pressure acting below the piston 34.

The piston 34 is then moved to cause the seat rib 35 to engage the gasket 40, and thereby the valve 30 is permitted to unseat by the action of spring 33.

With valve 30 unseated, fluid is vented from the reduction limiting reservoir 28 and consequently from the chamber 10 and the equalizing reservoir 12.

The further reduction in pressure in the equalizing reservoir 12 then causes the piston 9 to be again moved so as to again unseat the discharge valve 16, and the operation of venting fluid from the brake pipe and of supplying the vented fluid to the timing reservoir 36 is repeated.

A second reduction in brake pipe pressure is thus automatically effected and the valve device 2 again operates in the manner previously described, to close the valve 30 and after a time to permit the valve 30 to unseat, and this operation is successively effected, so long as the brake valve remains in service application position.

It will thus be seen that the apparatus on the locomotive operates to automatically effect successive reductions in brake pipe pressure, so long as the brake valve remains in service position.

On the cars of the train, the initial reduction in brake pipe pressure produced as hereinbefore described, causes a corresponding reduction in fluid pressure in the chamber 52 of the vent valve device 5. The pressure in chamber 55 can only reduce by flow through the restricted port 56, so that the pressure in chamber 52 reduces at a greater rate than the pressure in chamber 55. A differential pressure is thus created on the diaphragm 49, which causes the upward movement of the diaphragms 49 and 50, so that the diaphragm 50 is moved from the seat member 61, permitting the flow of fluid from the brake pipe 4, through pipe 54 and passage 53 to the quick service chamber 62.

A local venting of fluid from the brake pipe to the chamber 62 is thus produced, which is effected serially on the cars of the train from the front to the rear.

Due to the relative areas of the diaphragms 49 and 50, the light weight of the parts, and the short movement required to unseat the diaphragm 50, the valve device will operate when only a light differential of pressures has been created between the chambers 52 and 55, so that a local reduction in brake pipe pressure is produced very quickly in response to a reduction in brake pipe pressure.

On the other hand, by properly proportioning the flow area of the restricted port 56, the valve device can be made responsive only when the rate of reduction in brake pipe pressure is such as to cause the necessary differential pressure to be created.

As a consequence, the quick service valve device is rendered stable and is not responsive to fluctuations in brake pipe pressure, due to leakage from the brake pipe and slight variations in brake pipe pressure due to variations in the operation of the usual feed valve device.

In other words, our improved vent valve device is responsive and only responsive, when the reduction in brake pipe pressure is at a desired predetermined rate.

As soon as the rate of reduction in brake pipe pressure becomes less than the rate required to maintain the pressure differential necessary to hold the diaphragm 49 in its upper position, the spring 68 acts to move the diaphragms downwardly, so that the diaphragm 50 engages the seat member 61 and thus cuts off the further venting of fluid from the brake pipe. The successive waves of reduction in brake pipe pressure as automatically produced by operation of the locomotive apparatus, as hereinbefore described, causes corresponding successive operations of the quick service valve device 5 so that a succession of local reductions in brake pipe pressure are produced on each car of the train.

When the diaphragm 50 seats on the seat member 61, the fluid in chamber 62 is vented to the atmosphere at a rate as permitted by the restricted port 65, so that the pressure in said chamber is reduced to provide for a further reduction in brake pipe pressure when the diaphragm 50 opens communication from the brake pipe to the chamber at each successive reduction in brake pipe pressure.

The volume of the chamber 62 is made such as to give the desired brake pipe reduction, taking into consideration the volume of the brake pipe on each car.

The flow capacity of the restricted passage 65 may be such as to provide a reduction of pressure in the reservoir 62 of about five to ten pounds between successive operations of the quick service valve device.

By providing a service vent valve device on cars of the train which responds quickly to a light reduction in brake pipe pressure at a predetermined rate to effect a light predetermined local reduction in brake pipe pressure, the transmission time from the front to the rear of the train is greatly reduced as compared with previous devices of this character, so that the brakes on the cars at the rear end of the train are applied more nearly in synchronism with the brakes on cars at the head end of the train, and by providing means on the locomotive for automatically effecting successive reductions in brake pipe pressure so long as the brake valve is held in service application position, the brake pipe pressure can be reduced throughout the train to any desired degree, so as to produce the desired brake application.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. In a fluid pressure brake, the combination with a brake pipe, an equalizing reservoir, and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, and means responsive to the venting of fluid from the brake pipe for closing a communication through which fluid is vented from said reduction reservoir and to the cessation of venting of fluid from the brake pipe for opening said communication.

2. In a fluid pressure brake, the combination with a brake pipe, an equalizing reservoir, and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, and means responsive to the successive opening and closing of said valve device to successively close and open a communication through which fluid is vented from said reduction reservoir, while communication between the equalizing reservoir and the reduction reservoir is maintained.

3. In a fluid pressure brake, the combination with a brake pipe, an equalizing reservoir, and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, and means operated by fluid vented from the brake pipe for closing a communication through which fluid is vented from said reduction reservoir.

4. In a fluid pressure brake, the combination with a brake pipe, an equalizing reservoir, and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, and means operated by fluid vented from the brake pipe by operation of said valve device for closing a communication through which fluid is vented from said reduction reservoir.

5. In a fluid pressure brake, the combination with a brake pipe, an equalizing reservoir, and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a valve for controlling a communication through which fluid is vented from said reduction reservoir, and a piston open to the atmosphere through a restricted port and operated by an increase in fluid pressure for closing said valve.

6. In a fluid pressure brake, the combination with a brake pipe, an equalizing reservoir, and a valve device operated upon a reduction in pressure in said reservoir for venting fluid from the brake pipe, of a reduction reservoir, means for connecting the equalizing reservoir to the reduction reservoir to effect a reduction in pressure in the equalizing reservoir, a valve for controlling a communication through which fluid is vented from said reduction reservoir, and a piston open to the atmosphere through a restricted port and operated by an increase in fluid pressure for closing said valve, said piston being supplied with fluid under pressure vented from the brake pipe by operation of said valve device.

7. In a fluid pressure brake, the combination with a brake pipe, an equalizing reservoir, and a valve device operated upon a reduction in pressure in said reservoir for venting fluid from the brake pipe, of a reduction reservoir, a brake valve device having a position for connecting said equalizing reservoir with said reduction reservoir to effect a reduction in pressure in said equalizing reservoir, and means operated upon venting fluid from the brake pipe for closing a communication through which fluid is vented from the reduction reservoir and operated upon cessation of venting of fluid from the brake pipe for opening said communication for venting fluid from said reduction reservoir while communication between the equalizing reservoir and the reduction reservoir is maintained.

ELLERY R. FITCH.
EARLE S. COOK.